United States Patent [19]

Kridl et al.

[11] Patent Number: 4,512,833
[45] Date of Patent: Apr. 23, 1985

[54] ALUMINUM-SHIELDED COAXIAL CABLE REPAIR

[75] Inventors: Thomas A. Kridl, Union City; Carney P. Claunch, II, Redwood City, both of Calif.

[73] Assignee: Raychem Corporation, Menlo Park, Calif.

[21] Appl. No.: 560,286

[22] Filed: Dec. 12, 1983

[51] Int. Cl.³ .............................................. B32B 35/00
[52] U.S. Cl. .................................... 156/94; 29/402.09; 138/147; 156/54; 156/56; 156/86; 174/102 SP; 174/DIG. 8; 206/582; 428/77; 428/99; 428/133; 428/597; 428/675
[58] Field of Search ..................... 29/402.09; 138/147; 156/54, 56, 86, 94; 174/102 SP, DIG. 8; 428/40, 77, 99, 133, 597, 675; 206/582

[56] References Cited

U.S. PATENT DOCUMENTS

| | | | |
|---|---|---|---|
| 4,340,633 | 7/1982 | Robbins | 428/99 |
| 4,371,578 | 2/1983 | Thompson | 428/192 |
| 4,378,393 | 3/1983 | Smuckler | 428/99 |
| 4,386,629 | 6/1983 | Cook et al. | 156/86 X |
| 4,465,717 | 8/1984 | Crofts et al. | 428/40 |

*Primary Examiner*—Robert A. Dawson
*Attorney, Agent, or Firm*—Dennis E. Kovach; T. Gene Dillahunty; Herbert G. Burkard

[57] ABSTRACT

Aluminum-shielded coaxial cable is repaired by using a wraparound metallic sheet, such as copper, having a contact means on the sheet, such as "dragon skin" brass strips, and a sealing means, such as a mastic. The metallic sheet provides the electrical continuity and radio frequency shielding and the sealing means provides the environmental seal to prevent moisture from entering the opening in the aluminum shield. The sheet and contact means are held in position by compression means, such as clamps, and the sheet and compression means can then be covered with a wraparound heat-recoverable closure to protect the entire assembly.

13 Claims, 2 Drawing Figures

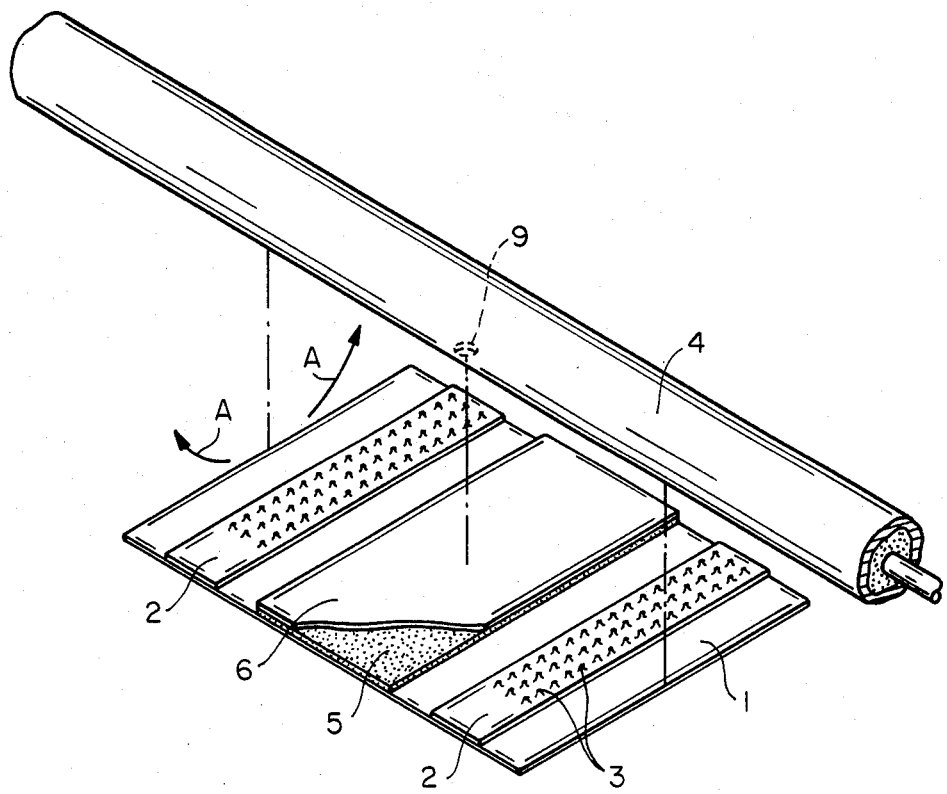
FIG_1
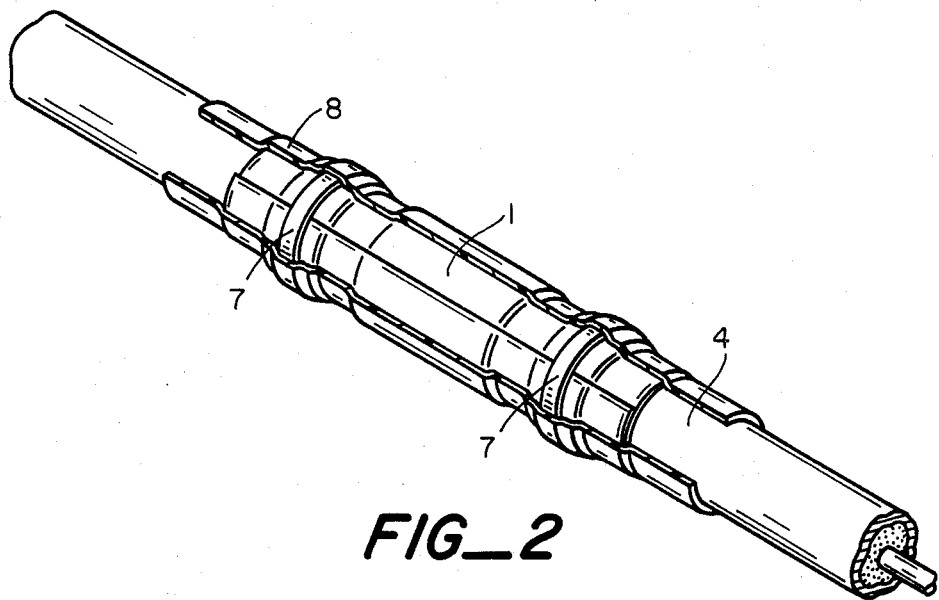
FIG_2

ALUMINUM-SHIELDED COAXIAL CABLE REPAIR

FIELD OF THE INVENTION

This invention relates to repair of cracks or other openings in the aluminum shielding of coaxial cables having an aluminum outer conductor, also sometimes referred to as the jacket.

BACKGROUND OF THE INVENTION

Aluminum-shielded coaxial cable is commonly used in aerial installations where it is supported on poles. Due to the high thermal expansion coefficient of aluminum, expansion loops are used in such installations to ease the tension exerted on splices, tap boxes, junctions, and other equipment to which the coaxial cable is connected. Cracks frequently develop in the aluminum shielding due to a number of reasons, including repeated flexing and work hardening of the aluminum, defects in the manufacture of the aluminum shielding, and incorrect handling or installation of the aluminum-shielded coaxial cable.

When cracks or other openings occur in the aluminum shielding, a number of problems result, which include radio frequency (RF) interference passing through the shielding in both directions, which cause interference with the signals carried by the cable when radio frequencies enter through the opening in the aluminum shield and interference with other transmitted signals when the signal carried by the cable leaks out of the cable through the opening in the aluminum shield. The opening in the aluminum shield also allows moisture to enter which causes corrosion and interferes with the dielectric properties of the insulation between the outer conductor aluminum shielding and the center conductor of the cable.

Aluminum-shielded coaxial cable is difficult to repair because of the properties of the aluminum, including the oxidation layer on the aluminum, the corrosion tendencies of aluminum and the cold flow or stress relaxation of the aluminum. In order to properly repair a crack in the aluminum shield, the opening must be electrically-shielded to prevent radio frequency interference in and out of the cable and it must be environmentally sealed to prevent moisture from entering the cable. The methods conventionally used to repair the cables include cutting the cable to remove the portion of the cable containing the crack in the shield and splicing the cable together using a splice connector. This method has the disadvantages of requiring an interruption of the service carried by the cable and in those cases where insufficient cable length is available, an additional length of cable must be supplied, thus requiring two splice connectors. Another method involves the use of a conductive tape to wrap the aluminum jacket of the cable, such as disclosed in U.S. Pat. No. 4,283,238. This method has the disadvantage of being efficient in establishing the radio frequency shielding because of the oxide layer on the surface of the aluminum interfering with the electrical contact between the aluminum shield and the conductive tape.

DESCRIPTION OF THE INVENTION

This invention provides a wraparound article for repair of aluminum-shielded coaxial cable which comprises a metallic sheet having thereon contact means having sufficient hardness and being adapted to penetrate the surface of the aluminum shield and having sealing means thereon adapted for closing the opening in the aluminum shield to provide environmental seal of the opening. The article above is applied to the aluminum shielding of the cable with sufficient compression force so that the contact means penetrates the surface of the aluminum shield sufficient to establish the desired electrical contact. It is preferable that the article be installed with a compression means which maintains the contact between the contact means and the aluminum shield. It is further preferable that a wraparound heat-recoverable closure be placed around the metallic sheet, compression means and a portion of the aluminum shield to provide an overall environmental seal thereof.

The metallic sheet used in this invention should be sufficiently conductive to provide electrical continuity and radio frequency shielding. Various metallic sheets may be used, but copper is the preferred material for the metallic sheet because of its high electrical conductivity which provides superior electrical continuity and radio frequency shielding. The metallic sheet useful in this invention may be a laminate, a fabric, braid or other configuration provided it has the desired electrical continuity and other properties specified herein.

The connecting means must be of sufficient hardness to penetrate and appropriate configuration to penetrate the surface of the aluminum shield. A convenient configuration for the contact means is a "dragon skin" where the protrusions from the "dragon skin" act as teeth to engage and penetrate the surface of the aluminum shield. The contact means should be selected from a material which does not induce excessive corrosion between the contact means and the aluminum shield. Various materials will obviously meet these criteria, but the material which is preferred for use in this invention is brass and more preferred are zinc plated brass and other tinned (plated) brass contacts.

The sealing means may be any suitable material which will provide sufficient moisture sealing to prevent moisture from entering the opening in the aluminum shield. The sealing material may be most any conventional mastic adhesive or other material suitable for use as a moisture barrier, such as the materials in U.S. Pat. Nos. 3,983,070, 4,374,231, 3,478,448, 4,117,027 and 3,965,215. In some applications it may be preferred to use a conductive sealing material such as conductive mastic.

The compression means for making and/or maintaining the contact between the contact means and the aluminum shield may be any conventional tool or clamp. It is particularly preferred that "Ty wrap" type or strap type compression means be used since they are easy to install and are compact in size.

The wraparound heat-recoverable closure for enclosing the metallic sheet and a portion of the aluminum shield may be any conventional closure such as those disclosed in U.S. Pat. Nos. 3,379,218, 3,455,366, 3,770,556, 3,530,898 and 4,366,201.

The article and methods for repair of aluminum-shielded coaxial cable according to this invention provide the advantages of having good radio frequency shielding due to the good contact between the metallic sheet and the aluminum shielding provided by the contact means penetrating the surface of the aluminum shielding. This excellent electrical continuity is obtained by the contact means biting through the oxide layer on the aluminum and is retained over a long period of time due to the penetration of the surface of the aluminum shield. Other advantages include the capability of repairing the cable according to this invention without interrupting the service carried by the cable and a permanent environmental seal to prevent moisture from entering the coaxial cable. An additional advantage of this seal is to prevent moisture which may already be in the cable from coming out of the cable and corroding the contact means of this invention.

BRIEF DESCRIPTION OF THE DRAWINGS

FIG. 1 shows the metallic sheet according to this invention in position for installation on the coaxial cable.

FIG. 2 shows a cutaway view of the installed metallic sheet according to this invention together with a wraparound heat-recoverable closure.

DESCRIPTION OF A PREFERRED EMBODIMENT

Referring to FIG. 1 metallic sheet 1, which is copper, has soldered to it brass strips 2 which have "dragon skin" type teeth 3 protruding therefrom for contact with the aluminum shield 4. The copper sheet also contains a sealing material 5, which is a conventional mastic, covered by a release paper 6 which is removed from the mastic before the metallic sheet is installed on the aluminum shield. The metallic sheet is applied to the aluminum shield of the coaxial cable as indicated by arrows A in order to cover the opening 9 in aluminum shield 4.

FIG. 2 shows the installed metallic sheet 1 which is held into position with compression means 7 which provides sufficient force to force the teeth 3 of brass strip 2 to penetrate the surface of the aluminum shield 4. The installed metallic sheet 1 and compression means 7 and a portion of aluminum shield 4 are then covered with a conventional heat-recoverable wraparound closure 8.

We claim:

1. A wraparound article for repair of the aluminum shielding of a coaxial cable comprising:
    a metallic sheet having thereon contact means having sufficient hardness to and being adapted to penetrate the surface of the aluminum shield; and
    sealing means on the metallic sheet adapted for closing an opening in the aluminum shield to provide an environmental seal of the opening.

2. An article according to claim 1 wherein the metallic sheet is copper.

3. An article according to claim 1 wherein the contact means is brass.

4. An article according to claim 2 wherein the contact means is a brass strip soldered to the copper sheet.

5. An article according to claim 1 further comprising compression means on the metallic sheet for forcing the contact means into the surface of the aluminum shield or maintaining the contact between the contact means and the aluminum shield.

6. An article according to claim 1 further comprising a wraparound, heat-recoverable closure adapted for covering the metallic sheet and a portion of the aluminum shield to provide environmental seal thereof.

7. A method of repairing the aluminum shield of a coaxial cable comprising applying sealing means to close the opening in the aluminum shield to provide environmental seal of the opening; wrapping around the shield to cover an opening in the shield, a metallic sheet having thereon contact means having sufficient hardness to and being adapted to penetrate the surface of the aluminum shield; and applying a compression force to force the contact means into the surface of the aluminum shield.

8. A method according to claim 7 wherein the sealing means is on the metallic sheet.

9. A method according to claim 7 further comprising applying a compression means to maintain contact between the contact means and the aluminum shield.

10. A method according to claim 9 further comprising applying a heat-recoverable closure around the metallic sheet and a portion of the aluminum shield to provide environmental seal thereof.

11. A kit for the repair of the aluminum shield of a coaxial cable comprising:
    a metallic sheet having thereon contact means having sufficient hardness to and being adapted to penetrate the surface of the aluminum shield and having thereon sealing means for closing the opening in the aluminum shield to provide an environmental seal of the opening; and
    compression means for forcing the contact means into the surface of the aluminum shield or maintaining the contact between the contact means and the aluminum shield.

12. A kit according to claim 11 wherein the sheet is copper and the contact means is brass.

13. A kit according to claim 11 further comprising a wraparound heat-recoverable closure adapted for covering the metallic sheet, the compression means and a portion of the aluminum shield after the sheet and compression means are installed around the aluminum shield.

* * * * *